United States Patent [19]
Kelly

[11] 3,730,464
[45] May 1, 1973

[54] SHEET METAL BRACKET

[76] Inventor: Larry A. Kelly, Portugal Cove Road, P.O. Box 9004, Postal Station B, St. John's, Newfoundland, Canada

[22] Filed: Jan. 25, 1971

[21] Appl. No.: 109,494

[52] U.S. Cl. ............................248/57, 248/300
[51] Int. Cl. ...........................................F16m 13/00
[58] Field of Search........................248/27, 57, 247, 248/248, 300

[56] References Cited

UNITED STATES PATENTS

| | | | |
|---|---|---|---|
| 3,041,033 | 6/1962 | Schwartz | 248/248 |
| 2,271,504 | 1/1942 | Kees et al. | 248/DIG. 6 |
| 1,346,895 | 7/1920 | Johnson | 248/DIG. 6 |
| 3,214,126 | 10/1965 | Roos | 248/57 X |

Primary Examiner—William H. Schultz
Attorney—Otto John Munz

[57] ABSTRACT

A sheet metal bracket having a pair of triangular shaped plates supports an outlet box, switch box and the like on ceiling or floor joists or sidewall studding. The flexibility of the sheet metal of the cantilever supported bracket permits the plate member to assume various angular positions with respect to its mounting on the joists or studding. A plurality of longitudinally spaced apertures on the bracket permit various mounting locations and the optional use of non-metallic and conduit type wiring. A modified support uses two telescoping interlocking engaging brackets to provide a rigid support between two laterally spaced joists or studding.

2 Claims, 5 Drawing Figures

PATENTED MAY 1 1973   3,730,464

SHEET METAL BRACKET

BACKGROUND OF THE INVENTION

This invention relates generally to an electrical fixture supporting device and more particularly to a supporting device for mounting outlet boxes, switch boxes or the like, between spaced building members such as ceiling or floor joists or sidewall studding.

The conventional support for an outlet box and the like is accomplished by means of inserting a threaded stud member through a centrally positioned aperture located in the bottom wall of the outlet box and thence placing a lock nut onto the stud member to secure the outlet box into a rigid position. Accordingly, disadvantages are encountered in mounting an outlet box in a designated location, in having electrical wires interfering with the center stud mounting and the like.

SUMMARY OF THE INVENTION

This invention eliminates the aforementioned disadvantages of the conventional supporting device for an outlet box and the like and provides a novel and improved electrical fixture supporting device which has more versatile uses.

According to one aspect of the present invention, there is provided a supporting device for mounting an outlet box in which the outlet box is secured to the supporting device, that is, a cantilever mounted bracket or hanger by a plurality of sheet metal screws inserted through apertures in the walls of the outlet box and bracket.

According to another aspect of the present invention, there is provided two cantilever mounted brackets or hangers that are secured in a telescoping interlocking engaging manner at their ends thereof to form a support for an outlet box between a pair of laterally spaced joists or studs.

Further, according to another aspect of the present invention, there is provided a cantilever mounted compressed bracket or hanger to form a support for ganging switch boxes.

Therefore, the primary object of the present invention is to provide a sheet metal bracket device for mounting outlet boxes, switch boxes or the like, between spaced building members such as ceiling or floor joists or sidewall studding. The bracket device is relatively universal in its adaptability to the varying needs and requirements of a construction project and can be quickly and expediently installed by the electrician as he is setting up outlet boxes during the course of an electrical wiring installation.

Another object of this invention is to provide a bracket device for outlet boxes and the like which is simple and economical in construction and contributes materially to reducing the cost of an electrical wiring installation.

Still another object of this invention is to provide a bracket device for outlet boxes and the like, which is so constructed that it can be installed between ceiling joists or similar joists or studdings without the requirement of any particular measurements being made prior to installation and thus the installation requires only a minimum of effort and time.

Still a further object of this invention is the provision of telescoping interlocking engaging brackets or hangers being mounted between joists or studding to form a longitudinally extensible and adjustable supporting device for an outlet box or the like.

DESCRIPTION OF THE PREFERRED EMBODIMENT

Figure 1:
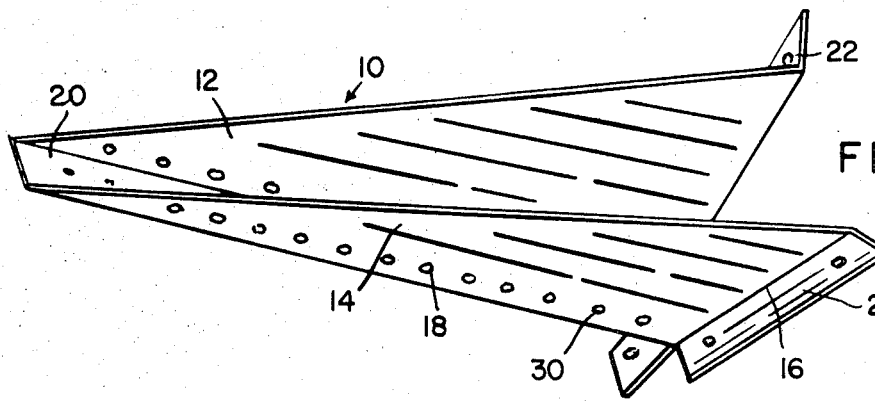
FIG. 1 is a perspective view of a bracket device for mounting an outlet box in accordance with one embodiment of the present invention.

Although specific forms of the invention have been selected for illustration in the drawings, and the following description is drawn in specific terms for the purpose of describing those forms of the invention, this description is not intended to limit the scope of the invention, which is defined in the claims.

Referring now to the drawings, and particularly to FIG. 1, which shows one embodiment of this invention, the bracket device is designated generally by the numeral 10 and is preferably made of a relatively thin flexible sheet metal material of a suitable gauge. The bracket 10 is structurally strong enough to support the normal household electrical fixture. The bracket 10 may be a standard stock item with the electrician for mounting any usual type of electrical fixture to the wooden joists or studding.

The bracket 10 is in the form of a pair of similar triangular shaped plate members 12, 14 wherein the two legs of the triangle consist of a short leg portion 16 and a long leg portion 18. An elongated member 20 is structurally connected to the long leg portions 18 of both triangular shaped plate members 12, 14 as clearly shown in FIG. 1.

With the bracket 10 made of sheet metal, the extensions of the short leg portions 16 may be suitably balanced or cut to facilitate bending the bracket ends into the shapes of outwardly projecting flange members 22, 24. Thus, the bracket may be secured in the desired position by means of nails or screws or the like, inserted through suitable apertures in the flange members 22, 24 and thence into a ceiling wooden joist.

Figure 3:
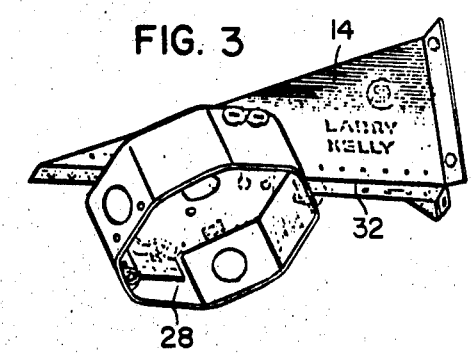
FIG. 3 is a perspective view of a compressed bracket device in accordance with the second embodiment of the present invention.
Figure 2:
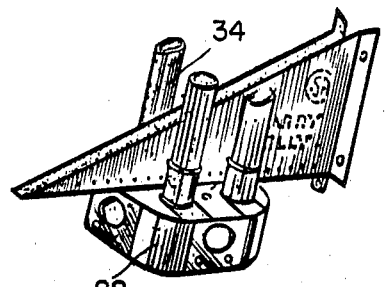
FIG. 2 is a perspective view of a compressed bracket device having electrical wire means inserted in an outlet box arrangement; in accordance with a second embodiment of the present invention

In FIGS. 2 and 3, there is shown an outlet box 28 mounted on the bracket 10 which in turn is installed in a cantilever manner on the given ceiling wooden joist 26. In this embodiment, the electrical installation is adapted to receive normal house or apartment building type wiring. That is, non-metallic type wiring may be readily utilized as will be explained hereinafter more fully.

Figure 4:
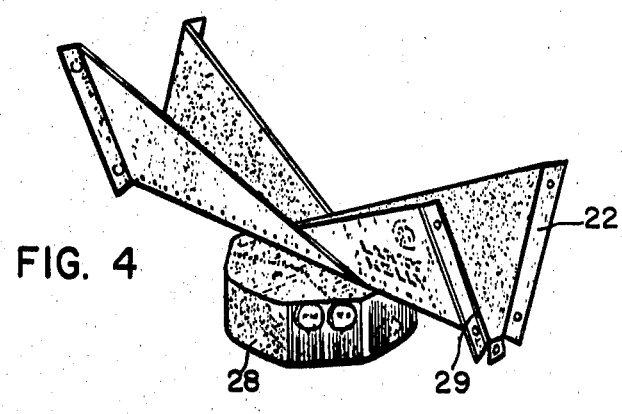
FIG. 4 is a perspective view illustrating two bracket devices that are telescoped and interlocked together to support an outlet box in accordance with a third embodiment of the present invention.
Figure 5:
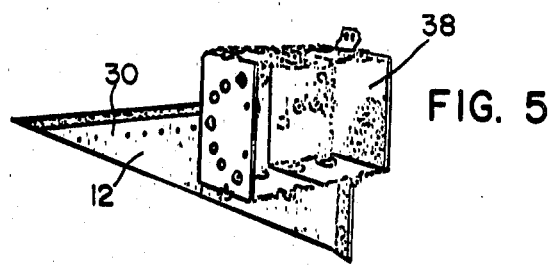
FIG. 5 is a perspective view of a compressed bracket device for mounting ganging switch boxes in accordance with a fourth embodiment of the present invention.

The flexibility of the sheet metal of the bracket 10 permits the plate members 12, 14 to be bent slightly inwardly or outwardly whereby various angular positions may be achieved between the plate members. In FIGS. 2, 3 and 5, the plate members are compressed or squeezed together by hand pressure whereby the plate members are substantially parallel to each other. In the FIGS. 1 and 4, the plate members are bent outwardly by hand pressure whereby the plate members are in an oblique angular relationship to each other. In other words, the edge connections between plate member 12 and elongated member 20 and between plate member 14 and elongated member 20 form hinge connections therebetween. This construction enables the entire length of the flange members 22, 24 to be positioned on a wooden joist in a close relationship to each other as shown, for example in FIG. 3, or the flange member positioned along a greater area of the joist 26 as shown in FIG. 4.

In the prior art, the conventional outlet box is secured to a bracket by means of inserting a threaded stud member through a centrally positioned aperture located in the bottom wall of the outlet box and thence placing a lock nut onto the stud member to tightly secure the outlet box to the bracket. In contradistinction, the bracket of the present invention is provided with apertures 30 constructed in the margins along the long leg portions 18 of each of the plate members 12, 14. That is, the apertures are constructed at spaced intervals adjacent to the longitudinal edge or hinge means along the entire length thereof. Likewise, apertures 32 are constructed at spaced intervals adjacent to the longitudinal edge or hinge means along the entire length of the elongated member 20 joining the two plate members 12, 14. It is readily seen that these apertures 30, 32 of the bracket permit the installation of the outlet box at random positions on the bracket 10. Thus, the outlet box 28 may be installed in a selective position without the requirement of any particular measurements being made prior to installation. This unique fastening constitutes a substantial advancement over the prior art as an outlet box may be installed in a given position with a minimum of effort and time.

As noted above, FIG. 1 embodiment utilizes non-metallic type wire and this is readily accomplished by the above described bracket construction. To put it another way, by eliminating the need of a center supporting stud for the outlet box, the bracket of the present invention substantially reduces the interference problem between the electrical wires and the said center studs. It is readily seen in FIG. 3 that an electrical wire may be inserted without interference through the central opening in the bottom of the outlet box 28.

It is to be noted in FIG. 2, there is illustrated the compressed version of the bracket 10 and in addition, electrical conduit type wires 34 are readily inserted into the desired apertures of outlet box 28.

In the embodiment shown in FIG. 4, two brackets 10 are illustrated in wide open positions and may be cantilever supported on a pair of laterally spaced wooden joists. The outermost ends of the brackets 10 telescope, interlock and engage each other to provide greater strength to the bracket device. Further, this construction provides a limited amount of adjustment between the respective brackets to compensate for different distances between two laterally spaced joists. The outlet box 28 is secured to the combined bracket support to provide a rigid and strong single support.

FIG. 5 embodiment illustrates a compressed bracket 10 for supporting ganging switch boxes 38. It is readily seen that the boxes 38 are supported by the bracket 10 and also on a wooden joist. Sheet metal screws may be readily inserted through apertures 30 of plate member 12 to secure the boxes 38 to the bracket 10. Also, the flanges of the boxes 38 may be attached to a wooden joist for added support.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed is:

1. A bracket device for mounting an outlet box having openings therein adapted for the insertion of electrical conduit type wires, said bracket device being supported between a pair of laterally spaced building members such as wooden joist or stud means, said device being formed of relatively thin sheet metal and comprising a first housing including a pair of triangular shaped apertured plate members, each plate member having a short leg portion and a long leg portion; an elongated apertured member structurally connected to the long leg portions of each plate member; said plate members being integrally provided with flange members projecting outwardly from the short leg portions, said flange members being capable of being secured to one of said joist or stud means; the edge connections among the plate members and the elongated member forming hinge means; the above-defined housing being duplicated as a second housing; said first and second housings being supported in a canti-lever manner to the laterally spaced building members opposite each other whereby the outermost ends of the respective plate members are arranged in a telescoping interlocking engaging manner to provide a single longitudinally extensible and adjustable support and said apertures of the plate and elongated members being capable of receiving screw means for the rigid securing of the outlet box to said bracket device whereby the electrical conduit type wires may be readily insertable in the openings of the outlet box.

2. A bracket device for mounting an outlet box having openings therein adapted for the insertion of electrical conduit type wires, said bracket device being supported on a building member such as wooden joist or stud means, said bracket device being formed of relatively thin sheet metal and comprising:

a pair of triangular shaped aperture plate members, each plate member having a short leg portion and a long leg portion;

an elongated apertured member structurally connected to the long leg portions of each plate member;

said plate members being integrally provided with flange members projecting outwardly from the short leg portions;

the edge connections among the plate members and the elongated member forming hinge means whereby said hinge means permit said plate members of assuming various angular positions relative to each other; and said flange members being capable of being secured at selective locations on said joist or stud means and said apertures of the plate and elongated members being constructed at spaced intervals adjacent to said hinge means along the entire length thereof, said apertures of the plate and elongated members being capable of receiving screw means for the rigid securing of the outlet box to said bracket device, whereby the electrical conduit type wires may be readily insertable in the openings of the outlet box.

* * * * *